United States Patent [19]

Wilde et al.

[11] Patent Number: 5,011,604

[45] Date of Patent: Apr. 30, 1991

[54] USE OF MICROALGAE TO REMOVE POLLUTANTS FROM POWER PLANT DISCHARGES

[76] Inventors: Edward W. Wilde, 1833 Pisgah Rd., North Augusta, S.C. 29841; John R. Benemann, 2741 O'Harte, San Pablo, Calif. 94806; Joseph C. Weissman, 2086 N. Porpoise Pt. La.; David M. Tillett, 911-3 Coquina La., both of Vero Beach, Fla. 32963

[21] Appl. No.: 476,182

[22] Filed: Feb. 7, 1990

[51] Int. Cl.$^5$ .............................................. C02F 3/32
[52] U.S. Cl. .................................. 210/602; 210/614; 210/623; 210/747; 210/170; 210/194; 47/1.4; 435/262; 435/946
[58] Field of Search ............... 210/602, 614, 620, 621, 210/623, 626, 747, 170, 194, 195.3; 435/946, 262; 47/1.4

[56] References Cited

U.S. PATENT DOCUMENTS

| | | | |
|---|---|---|---|
| 2,867,945 | 1/1959 | Gotaas et al. | 435/946 |
| 3,385,786 | 5/1968 | Klock | 47/1.4 |
| 3,768,200 | 10/1973 | Klock | 210/602 |
| 4,005,546 | 2/1977 | Oswald | 210/602 |
| 4,695,384 | 9/1987 | Ripl et al. | 210/602 |

FOREIGN PATENT DOCUMENTS

| | | |
|---|---|---|
| 58-143887 | 8/1983 | Japan . |
| 60-110399 | 6/1985 | Japan . |
| 61-171597 | 8/1986 | Japan . |
| 524777 | 11/1976 | U.S.S.R. . |
| 234244 | 4/1977 | U.S.S.R. . |

OTHER PUBLICATIONS

Weisman & Benemann, "Biomass Recycling and Species Competition in Continuous Cultures", Bioengineering Biotechnology 21:627-648 (1979).
Castenholz, "The Biology of Blue-Green Algae in Hot Springs", N. G. Carr, B. A. Wilton (eds) The Biology of Blue Green Algae, U. of California Press, pp. 379-414 (1973).
Darnall, et al. "Selective Recovery of Gold and Other Metal Ions from an Algal Biomass", Environmental Science Technology, 20:206-208 (1986).
Wilde, Edward W.; Benemann, John R.; A Proposed Algaculture Facility at L Lake DPST 88-588, Published after 2/9/89.
Pretorius and Hensman, "The Selective Cultivation of Easily Harvestable Algae using Cross-Flow Microstraining", Water Science Technology 17:791-802 (1985).
Benemann, et al. "Development of Microalgae Harvesting and High Rate Pond Technologies in California", G. Shalef, C. J. Soder (eds) Algae Biomass Elsview Press pp. 457-496 (1980).

Primary Examiner—Stanley Silverman
Assistant Examiner—Christopher Upton
Attorney, Agent, or Firm—Harold M. Dixon; Stephen D. Hamel; Richard E. Constant

[57] ABSTRACT

A method and system for removing pollutants dissolved in the aqueous discharge of a plant, such as a power plant, from a body of water having known hydraulogy and physicochemical characteristics, the method comprising (a) modifying the hydraulic system of the body of water including use of physical barriers to define a zone in a portion of the body of water which zone includes the discharge point and where the water has a range of physicochemical characteristics; (b) selecting a large and preferably filamentous, planktonically growing strain of algae adapted to absorb the particular pollutants and genetically dominating algae at the physicochemical characteristics of the zone; (c) establishing a colony of the selected algal strain in the zone; (d) harvesting a portion of the colony; and (e) reinnoculating the zone near the discharge point with a fraction of the harvested portion. The fraction used for reinnoculation can be adjusted to balance the rate of pollutant removal to the rate of pollutant discharge.

13 Claims, 2 Drawing Sheets

USE OF MICROALGAE TO REMOVE POLLUTANTS FROM POWER PLANT DISCHARGES

The United States Government has rights in this invention pursuant to Contract No. DE-AC09-76SR00001 between the U.S. Department of Energy and E. I. DuPont de Nemours & Co.

BACKGROUND OF THE INVENTION

1. Field of the Invention

The present invention relates to systems and methods for using microalgae. In particular, the present invention relates to the use of microalgae for removing pollutants discharged to a body of water from a power plant.

2. Discussion of Background

Water pollution is a major international problem. Polluted waters may be unfit for drinking, irrigation of croplands and recreational uses. Severe pollution may result in permanent destruction of the natural ecosystems in bodies of water and the wildlife that inhabit them.

Annually, in the Unites States alone, many billions of dollars are spent to avoid the pollution of bodies of water. Nonetheless, in some cases, technology does not exist for preventing some forms of pollution from reaching nearby water bodies, leaving only in situ methods for reducing the level of water pollution to acceptable levels.

The waste heat given off by power plants is a particular pollution problem. If discharged directly into a body of water, the waste heat can do substantial damage. Thermal shock can kill fish. Unrestrained algae growth, encouraged by the warm, nutrient-laden discharge waters, can result in eutophication of the cooling body and noxious blooms. The principle alternative to direct discharge to a body of water, cooling towers for discharging the waste heat to the atmosphere, is expensive.

Microalgae are used extensively in the treatment of waste waters because they can sequester large amounts of nutrients and other pollutants. At present, there are many municipal and industrial waste treatment plants that use microalgae in "oxidation" ponds to biodegrade wastes. However, there is no control over the algal species and, with few exceptions, no harvesting of the algal biomass generated in these ponds.

Aquacultural production of microalgae (algaculture) is a rapidly advancing branch of biotechnology. Microalgae are being produced and harvested commercially in several locations in the United States and other countries for the production of health supplements and a variety of other specialty, high-value products. Furthermore, there is now a commerical use of microalgal-based ion exchange systems for the recovery of selected heavy metals and microalgae are a potential source of a very large variety of other high value products such as specialty chemicals, animal feeds, fuels, lubricants, antibiotics and enzyme inhibitors.

Several commercial microalgae production systems exist in the United States. They use 10 to 25 acres of ponds with the one acre "high rate pond" as the basic production unit. In other countries, some algacultural efforts use shallow, diked ponds with little if any management. The major problems in algaculture are species control and harvesting. Species control is currently only achieved when the natural physicochemical conditions of these ponds favors the strains of algae grown therein for harvest.

Harvesting microalgae is difficult because of the small size of the algae. When microstrainers are used, they typically have small screen openings. Screen opening size must be very small to trap the microscopic algae. Such small screen openings can become plugged and impede the flow of water through the screens.

There is a need for a cost effective algaculture process and system for removing pollutants discharged to bodies of water from power plants.

SUMMARY OF THE INVENTION

According to its major aspects, the present invention is a system and process for removing pollutants discharged into or other substances found in a body of water by first modifying the hydraulic system of the water body to define a zone having a set of physico-chemical characteristics and including the discharge point. Suitable algae are then selected and the zone innoculated near the discharge point, the algae having been selected for their ability to assimilate the pollutants, to dominate genetically other species of algae in the zone, and to be confinable within the zone. A portion of the algae colony ultimately established will be harvested and a fraction of that portion returned to the zone near the pollutant discharge point to regulate the colony size and match the rate of pollutant removal to the rate of pollutant discharge.

It is a feature of the present invention that it may be applied to take advantage of nutrients dissolved in the effluents of electric power generating plants, the discharge of which is at an elevated temperature. Relatively few algae are adapted for such temperatures but several strains are. These are generally strains of blue-green algae (cyanobacteria) that ar also filamentous and therefore more easily confinable in and harvestable from the zone. The advantage of applying the present invention to such discharges is that the discharged nutrients, which would otherwise result in the eutrophication of the body of water, can be absorbed by harvestable, thermophilic algae that can be removed for productive uses elsewhere.

It is another feature of the present invention that a harrier such as a plastic curtain is used for two purposes: first, confinement of the selected algae to the zone of the body of water used for cultivation so that the remaining portion of the body is unaffected and available for other use; and second, modification of the hydraulic system of the body of water to increase the hydraulic residence time so that the cultivated algae colony has sufficient time to increase between the discharge point and the harvest point.

It is still another feature of the present invention that the redistribution of algae is effected by harvesting a portion of the algae and by re-innoculating the water body near the discharge inlet using a fraction of the harvested portion. By adjusting this fraction of the harvested algae, a powerful control is provided to help manage the overall process. The algae recycle fraction will determine the amount of algae in the zone, which in turn affects the amount produced and therefore the nutrient removal rate. There is an additional effect of algal recycle: it helps maintain species control in the zone since adjustment of the fraction can compensate for variations in environmental parameters such as sunlight, temperature, changes inflow, and nutrient concentration.

DETAILED DESCRIPTION OF PREFERRED EMBODIMENTS

The present invention is a system and a process for removing dissolved substances that can pollute a body of water. In general this system and method will not only remove substances that are nutrients such as ammonia, nitrates, phosphates and similar compounds, but also may include heavy metals, especially including radioisotopes of heavy metals, since the cell wall of blue-green algae is very effective in binding heavy metals.

Figure 1:
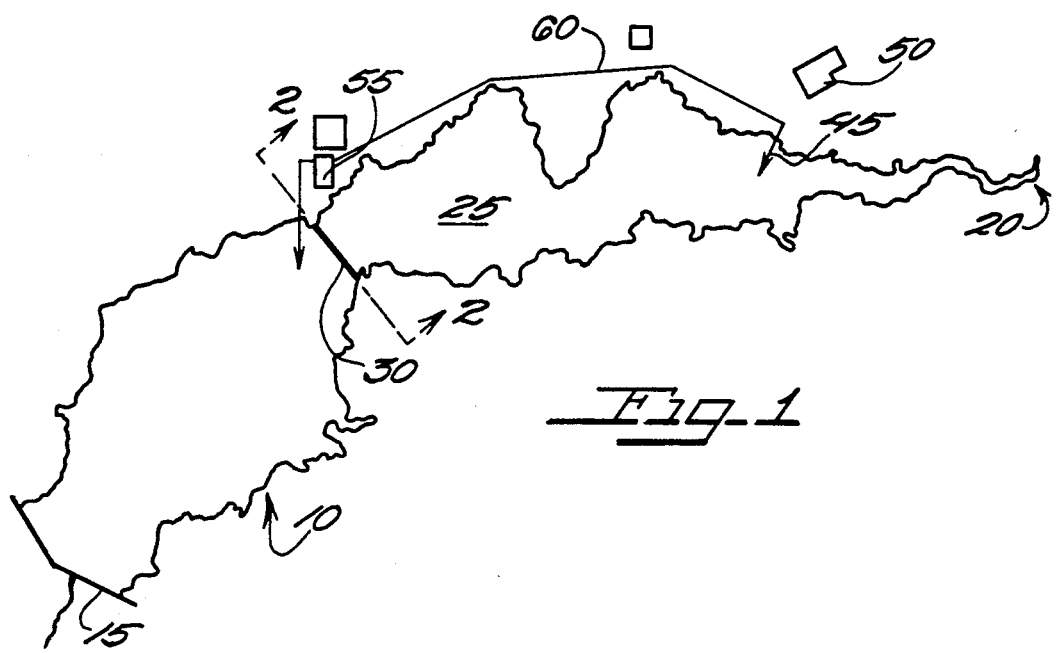
FIG. 1 is a top plan view of a body of water according to an embodiment of the present invention.
Figure 2:
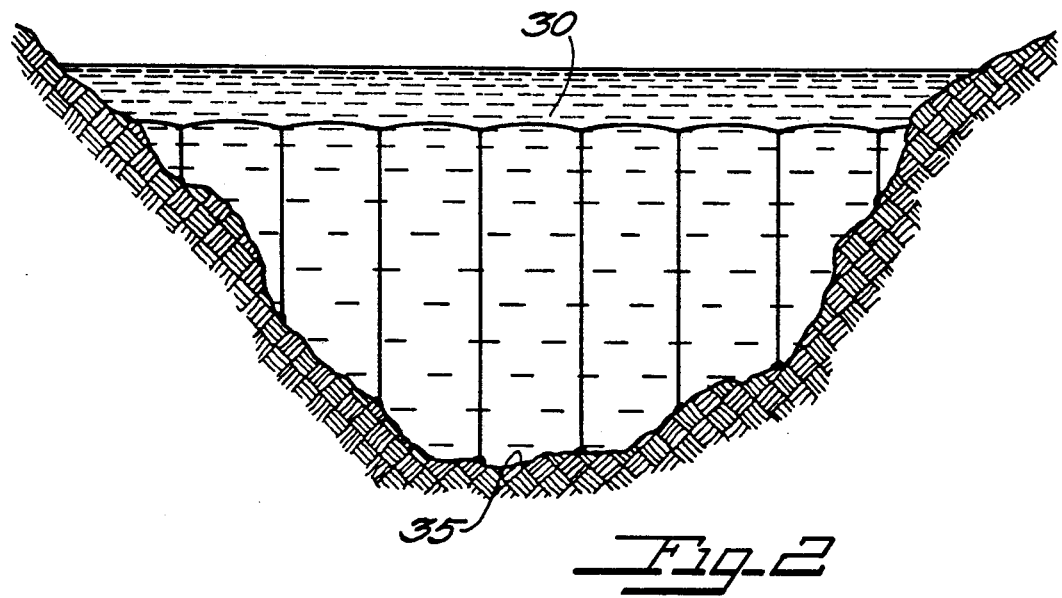
FIG. 2 is a cross sectional view taken along line 2—2 of FIG. 1.
Figure 3:
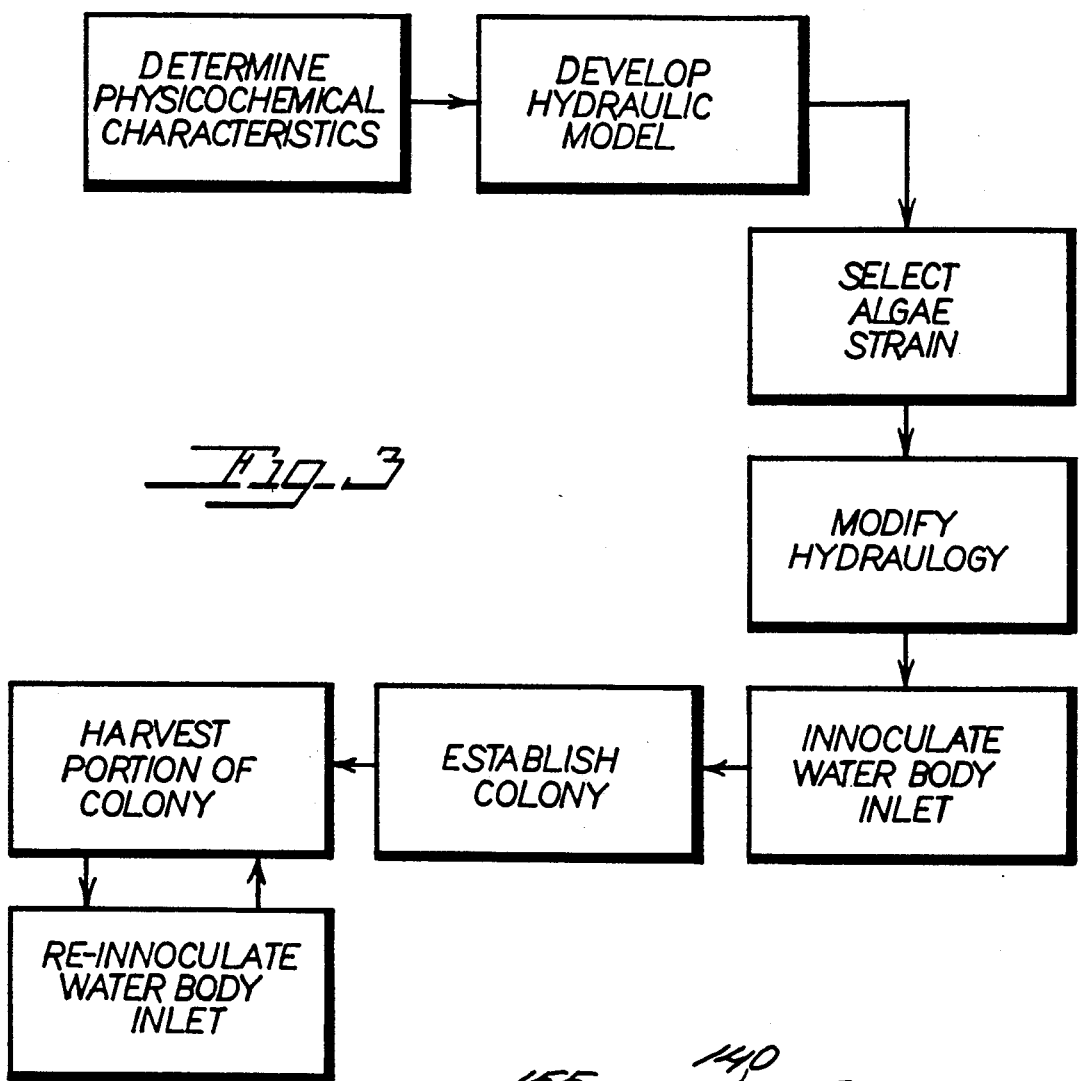
FIG. 3 is a flow chart of the process of an embodiment of the present invention.

Referring now to the flow chart of FIG. 3 throughout the following description and to FIGS. 1 and 2 in particular, the size of the body of water into which these substances are being discharged may be substantial, including natural and man-made lakes, lagoons, and reservoirs. FIG. 1 shows a typical body of water 10 made by damming one end 15 of a stream, flow being generall from the end at 20 to 15. The hydraulic and physicochemical characteristics of the body of water must be determined, including flow rates and directions, the temperature range, rate of variation, profile with depth, and so on, to develop a hydraulic model of the water body.

A zone, indicated generally by reference numeral 25 in FIG. 1, is then defined that will include at least a portion of the water body, but perhaps all of it in the case of a smaller lake or reservoir having no areas required for other uses.

Zone 25 is defined on the basis that it contains water having physicochemical characteristics tolerable by at least one selected strain of algae that can be established in the zone and dominate it genetically. However, zone 25 must be large enough in a hydraulic sense so that the time required for algae, introduced near the pollutant discharge point to travel from one end of the zone to the other with the currents, will be sufficient to produce enough biomass to remove the available nutrients.

It will be necessary to modify the hydraulic system of the existing body of water at least in part. At the opposing end of the zone, a means for confining the algae must exist, preferably by erecting a barrier 30, as shown in cross section in FIG. 2, such as a sheet of plastic, held in place by floats and anchors so that it rides in the water and extends from the water surface down to at least one meter and preferably up to three meters. The depth of barrier 30 is determined by the temperature and the light profiles at that part of the proposed zone. Barrier 30 need only be deep enough to confine most of the algal biomass. Below about three meters there is generally insufficient light for algae; therefore it is unnecessary for barrier 30 to extend farther. Also, a thermal discharge, favored for the growth of selected filamentous blue-green algae, will tend to ride above colder waters. Depending on conditions of the body of water, barrier 30 can have an attached apron (not shown) extending all the way to the bottom of the water body 35 to prevent fish from moving into the zone under barrier 30.

Other modifications to the hydraulic system of the body of water may also increase residence time or help homogenize the physicochemical characteristics. Baffles at or near a discharge point 40 of FIG. 1, improve mixing; flow diverters can be used, for example, to divert a hot water discharge to a shallow cove to maximize surface area; splitting or spreading the discharge point may also be necessary for mixing.

The primary goal of hydraulic modifications is the establishment of an algae confining zone within the body of water having essentially a range of physicochemical characteristics so that a strain of algae can establish a colony in the zone that will dominate genetically other algal strains. The more uniform the physicochemical characteristics, the easier it will he to pick algae specific to the characteristics and the more efficient the system will be. However, algae, being adaptable are hardy can be found to operate over a wide range of conditions. A secondary goal of establishing the zone is to facilitate harvesting of the favored strain.

The strain of algae selected for the zone, or more than one strain if appropriate, should be selected to (1) grow well in the physicochemical conditions in the zone; (2) he nontoxic; (3) be relatively large and preferably be filamentous, most preferably greater than 100 micrometers; (4) grow planktonically and be gas vacuolated for bouyancy regulation so that the algae remain in the photic zone; (5) grow rapidly and reproduce often over wide temperature ranges; (6) have minimum organic compound excretion while sequestering algal nutrient; (7) grow well in both high rate ponds and indilute cultures; (8) grow on low concentrations of carbon dioxide to maximize use of carbon in the water body; (9) be nitrogen fixing; and (10) not be subject to significant predation by zooplankton or attack by viruses or lytic bacteria. If the discharge is at an elevated temperature such as that from power plants, the algae should also be selected for survivability at high temperatures, perhaps even very high temperatures such as 55–60 degrees Celsius, and low temperatures characteristic of the coldest location of the cultivated zone in the coldest time of the year. Additionally, depending on the range of pollutants in the discharge, the strain of algae selected should have cell wall components capable of sequestering heavy metals including radionuclides.

Blue green algae as a group meet most of these requirements. In particular the species *Mastigocladus laminosus* as a thermophilic, filamentous, nitrogen-fixing, blue-green alga is well suited for use with discharge from power plants. Although typically found in hot springs such as those at Yellowstone National Park, it becomes dominant in virtually all aquatic systems (except those having extreme pH or other unusual characteristics) when water temperatures reach or exceed 45–50 degrees Celsius. This alga uses atmospheric nitrogen and is particularly effective in treating effluents with relatively low nitrogen to phosphorous ratios.

The objective of the selection step is to isolate algal strains and mutations of such strains that exhibit desirable characteristics in the zone. The selected algae would be grown in small laboratory cultures, followed by increasingly larger cultures, until an outdoor culture size of approximately 0.5 hectares is reached. The zone is innoculated near or at the discharge plume.

It may not be necessary in all cases to actually select and innoculate the zone with a non indigenous algal species, since the algae naturally present in the body of water could provide an adequate algal strain which can be promoted and enhanced.

The innoculum travels with the currents from the point of discharge 45 (FIG. 1) from power plant 50 to the opposing end of the zone, growing from energy from the light and assimilated nutrients and pollutants. With a sufficiently large zone from a hydraulic standpoint, the algae will divide once or twice in transit. Barrier 30 at the opposing end of the zone directs flow to the harvesting area 55 where microstrainers, an example of which is described below, separate at least a portion of the algae from the water. Following separation of algae from the water from zone 25, the water is returned below barrier 30 to body of water 10 and a portion of the harvested algae is forwarded by a recycle pipe 60. Initially it may be necessary to establish an innoculum facility at 65 to prepare the initial innoculum at startup of the system or for having additional algae ready for rapid changes in the quantity of discharged pollutants.

Figure 4:
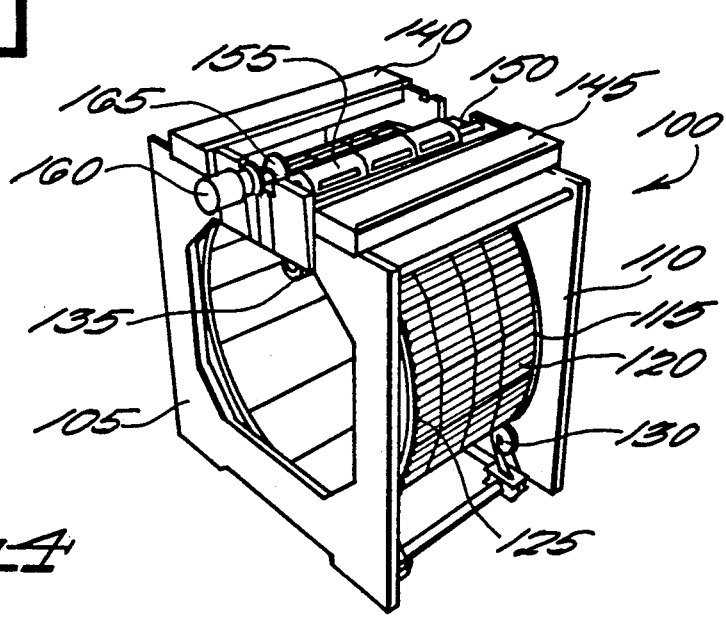
FIG. 4 is a perspective view of an a microstrainer for algae harvesting.

FIG. 4 shows one type of commerical microstrainer generally designated by the reference numeral 100. Microstrainer 100 has an upstream end frame 105 and a downstream endframe 110. Between endframes 105 and 110 is a drum 115 to which is attached a fine pore fabric panel 120. Drum 115 has a drum ring 125 with spur gears and is turned by a drum roller 130. Inside drum 115 is an outlet trough 135 for waste washwater. At the top of microstrainer 100 are two walkways 140 and 145 on either side of a washwater header pipe 150 with an array of jets. Pipe 150 has a splash guard 155 thereover. Adjacent to pipe 150 is a variable speed motor 160 for turning pinion drive 165 which drives the spur gears of drum ring 125.

Harvested algae in a slurry from the zone is washed into drum 115 which is turned by motor 160. The water component of the slurry passes through panels 120 but the algae is trapped. At the top of the rotation, washwater frees the trapped algae which falls into the waste washwater outlet trough 135 which carries the algae for re-innoculation or other uses.

A fraction of the algal biomass is then "recycled" by reinnoculating the zone near discharge point 45 until the density of biomass is great enough so the rate of assimilation of pollutants by the algae matches the rate pollutants are being discharged into zone 25. If that rate decreases, the fraction of harvested algae can be reduced. Normally, one-third to two thirds of the harvested portion would be recycled.

It will he apparent that many modifications to the foregoing detailed description are possible without departing from the spirit and scope of the invention, which is defined by the following claims.

What is claimed is:

1. A system for removing dissolved inorganic pollutants from a body of water, said body of water receiving said pollutants carried by a source of discharge of water from a power plant, said discharge at a temperature higher than the temperature of said body of water so that said discharge rides on said body of water until cooled, said system comprising:

a zone defined to include at least a portion of said body of water and having an inlet and an end opposite said inlet, said zone defined by a set of physiochemical characteristics and having means for receiving said discharge from said source near said inlet of said zone;

an algal colony having at least one strain of algae selected to dominate genetically other strains in water having said set of physiochemical characteristics and to provide means to absorb said pollutants as nutrients;

means for confining said at least one strain of algae and said discharge in said zone;

means for harvesting at least a portion of said algal colony so that said pollutants absorbed as nutrients are removed from said body of water;

means for innoculating said zone near said inlet with a fraction of said at least a portion of said harvested algal colony.

2. The system as recited in claim 1, wherein said algal colony further comprises filamentous, planktonically grown algae.

3. The system as recited in claim 2, wherein said algae average at least 100 micrometers in length.

4. The system as recited in claim 1, wherein said algae are thermophilic and thermo-tolerant blue-green algae.

5. The system as recited in claim 4, wherein said algae are strains of *Masigocladus laminosus*.

6. The system as recited in claim 1, wherein said confining means is a plastic barrier extending from the surface to up to three meters below the surface of said body of water.

7. The system as recited in claim 6, wherein said confining means is a plastic barrier extending from the surface to at least one meter below the surface of said body of water.

8. The system as recited in claim 7, wherein said harvesting means further comprises a microstrainer.

9. A method for removing inorganic pollutants from the discharge from a power plant to an inlet of a body of water, said discharge having a higher temperature than said body of water whereby said discharge rides on said body of water until said discharge cools, said method comprising:

defining a zone in said body of water, said zone including said inlet and characterized by a set of physiochemical characteristics, said zone including said discharge;

confining said thermal discharge to said zone;

cultivating in said zone an algal colony having at least one strain of algae that dominates genetically other algal species in water having said set of physiochemical characteristics of said zone;

harvesting at least a portion of said algal colony to remove said pollutants from said body of water; and innoculating said zone near said inlet with a fraction of said at least a portion of said harvested algal colony.

10. The method as recited in claim 9, further comprising the step of varying said fraction to match variations in the rate of discharge of pollutants from said power plant so that there is no net increase in said pollutants in said body of water.

11. The method as recited in claim 9, wherein said fraction ranges from one-third to two-thirds of said portion.

12. The method as recited in claim 9, wherein said algal colony is thermophilic, filamentous blue-green algae.

13. The method as recited in claim 9, wherein said harvesting is done by straining said algal colony through microstrainers.

* * * * *